United States Patent
Ryan

(10) Patent No.: US 7,283,521 B1
(45) Date of Patent: Oct. 16, 2007

(54) SYSTEM AND METHOD FOR REPORTING COMMUNICATION RELATED INFORMATION IN A PACKET MODE COMMUNICATION

(75) Inventor: Ronald D. Ryan, Coppell, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1176 days.

(21) Appl. No.: 09/697,822

(22) Filed: Oct. 26, 2000

(51) Int. Cl.
  *H04L 12/28* (2006.01)
  *H04L 12/56* (2006.01)

(52) U.S. Cl. .................. 370/389; 370/230; 370/242; 370/395.2; 379/70; 379/35; 455/404.2

(58) Field of Classification Search .......... 370/230, 370/242, 395.2, 352–356, 432, 389; 379/70, 379/38, 35, 229, 213.01; 455/404.2, 405, 455/414.2, 433, 457, 9, 67.11; 713/201, 713/150
See application file for complete search history.

(56) References Cited

U.S. PATENT DOCUMENTS

| | | | |
|---|---|---|---|
| 6,122,499 A * | 9/2000 | Magnusson | 455/405 |
| 6,424,701 B1 * | 7/2002 | Maillet et al. | 379/35 |
| 6,470,075 B1 * | 10/2002 | Prieur | 379/38 |
| 6,477,865 B1 * | 11/2002 | Matsumoto | 66/195 |
| 6,501,752 B1 * | 12/2002 | Kung et al. | 370/352 |
| 6,549,613 B1 * | 4/2003 | Dikmen | 379/70 |
| 6,654,589 B1 * | 11/2003 | Haumont | 455/67.11 |
| 6,707,813 B1 * | 3/2004 | Hasan et al. | 370/356 |
| 2001/0052081 A1 * | 12/2001 | McKibben et al. | 713/201 |
| 2002/0051457 A1 * | 5/2002 | Eloranta | 370/401 |
| 2002/0078384 A1 * | 6/2002 | Hippelainen | 713/201 |
| 2002/0150096 A1 * | 10/2002 | Sjoblom | 370/389 |
| 2003/0078041 A1 * | 4/2003 | Dikmen et al. | 455/433 |
| 2003/0108182 A1 * | 6/2003 | Dikmen | 379/229 |

OTHER PUBLICATIONS

Stewart, et al., "Stream Control Transmission Protocol," Internet Draft—http://search.ietf.org/internet-drafts/draft-ietf-sigtran-sctp-13.txt, p. 1-104.

Stewart, et al., "Stream Control Transmission Protocol," Internet—http://www.ietf.org/rfc/rfc2960.txt?number=2960, p. 1-126.

P. Mockapetris, "Domain Names—Implementation and Specification," Internet http://www.ietf.org/rfc/rfc1035.txt?number=1035, pp. 1-45.

Elz, R; Bush, R., "Clarifications to the DNS Specification," Internet—http://www.ietf.org/rfc/rfc2181.txt?number=2181, pp. 1-13.

(Continued)

*Primary Examiner*—Chirag G. Shah
(74) *Attorney, Agent, or Firm*—Haynes and Boone, LLP

(57) ABSTRACT

A method for lawful interception of communication related information is disclosed. In the preferred embodiment, the method includes detecting the occurrence of an event in a packet data network. The method also includes collecting communication related information of a communication in the packet data network in response to the detection of the event based at least in part on the detected event and providing the collected communication related information to one or more law enforcement agencies.

42 Claims, 2 Drawing Sheets

OTHER PUBLICATIONS

Aboba, B.; Beadles, M., "The Network Access Identifier," Internet—http//:www.ietf.org/rfc/rfc2486.txt?number=2486, pp. 1-7.

Digital Cellular Telecommunications System (Phase 2+); Numbering, Addressing and Identification (GSM 03.03 version 7.5.0 Release 1998); Global System for Mobile Communications; European Telecommunications Standards Institute 2000; pp. 1-30.

Digital Cellular Telecommunications System (Phase 2+); Lawful Interception; Stage 2 (GSM 03.33 version 8.0.0 Release 1999); Global System for Mobile Communications; European Telecommunications Standards Institute 2000; pp. 1-65.

Lawfully Authorized Electronic Surveillance; TR-45; J-STD-025; Rev. A; pp. 1-208.

Ryan, Ronald D., "T1P1 Surveillance Ad Hoc Working Document"; T1P1.SAH/2000-009 R3; Version 4; May 8, 2000, Kauai, Hawaii, pp. 1-53.

* cited by examiner

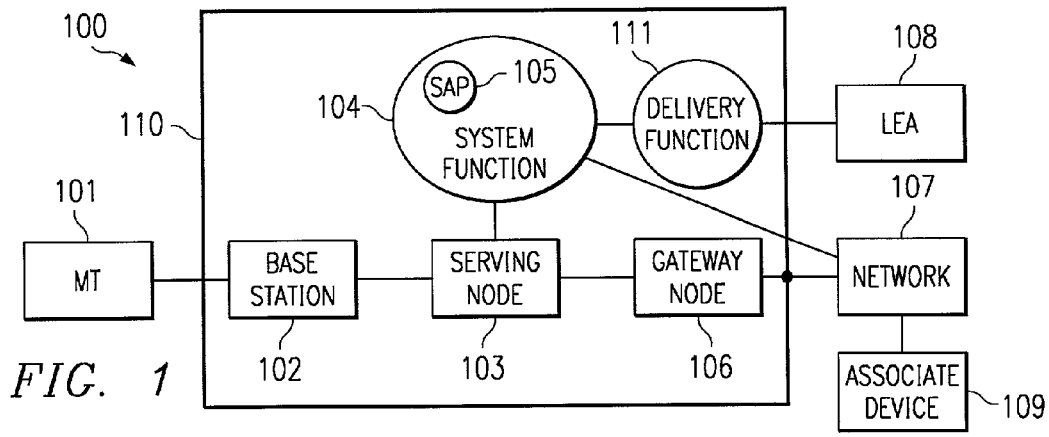
FIG. 1
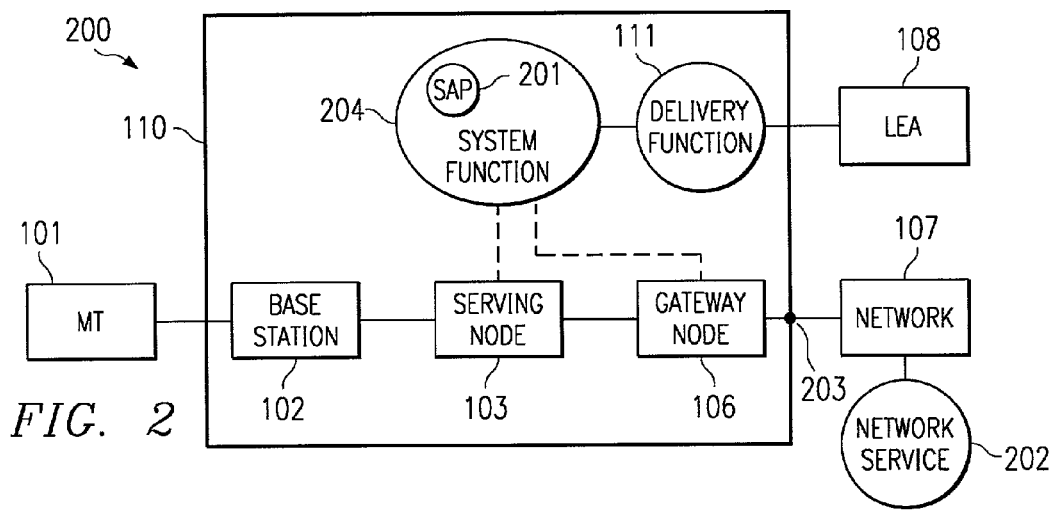
FIG. 2
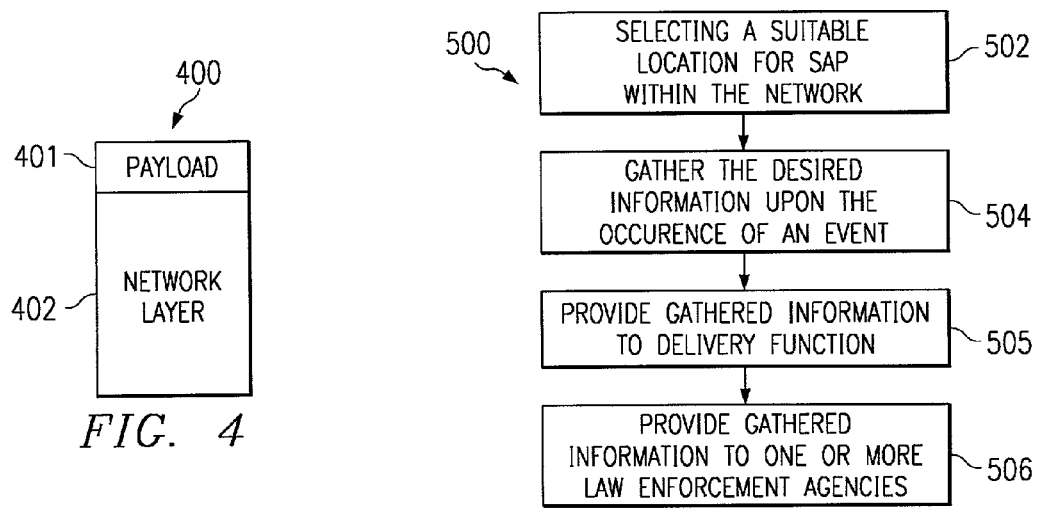
FIG. 4
FIG. 5

SYSTEM AND METHOD FOR REPORTING COMMUNICATION RELATED INFORMATION IN A PACKET MODE COMMUNICATION

TECHNICAL FIELD OF THE INVENTION

The present invention relates generally to the field of telecommunications and more particularly, to a system and method for lawful interception of communication for reporting communication related information in a packet mode communication.

BACKGROUND OF THE INVENTION

Today there are methods and procedures for intercepting circuit mode communications. By intercepting circuit mode communications, two types of information may be gathered. The first type of information is the content of the communication and the second type of information that can be gathered is communication related information. Communication related information includes information such as dialing or signaling information that identifies the origin, direction, or termination of each communication generated or received by a subscriber by means of any equipment, facility or service of a telecommunications carrier.

In order to lawfully intercept communications, Law Enforcement Agencies (LEA) need permission from a court of competent jurisdiction. Often the law enforcement agencies are given limited authority to intercept one or the other of the two types of information in a communication, i.e. either the content of the communication or the communication related information.

With the increase in recent years in the number of users of packet data networks providing packet mode communications, LEAs increasingly expect a similar capability to provide call intercept for subscribers or users of these packet data networks. Because of the need of LEAs to be able to access these types of communications, telecommunication carriers are required to include the capability of intercepting communications in new equipment and providing information to the LEAs. However, because of the implications of privacy of users or subjects of the interception, it is desirable that only the authorized information is provided to the LEAs. For example, if a particular LEA is only authorized to receive communication related information about a particular intercept subject, the equipment and/or the network of the carrier should be able to provide only communication related information about the subject to the particular LEA and not the entire content stream.

Accordingly, there is a need in the art for a system and method for lawful interception of communication for reporting communication related information in a packet mode communication.

SUMMARY OF THE INVENTION

In accordance with the teachings of the present invention, a system and method for lawful interception of packet mode communication for providing communication related information is disclosed.

For example, one aspect of the invention includes a method for lawful interception of communication related information. In the preferred embodiment, the method includes detecting the occurrence of an event in a packet data network. The method also includes collecting communication related information of a communication in the packet data network in response to the detection of the event based at least in part on the detected event and providing the collected communication related information to one or more law enforcement agencies.

Another aspect of the invention includes a system for lawful interception of communication related information. In the preferred embodiment, the system includes a base station for receiving an event from an intercept device in a packet mode data network. The system further includes a serving node which is operable to communicate with the base station. The system further includes a Surveillance Access point (SAP) which is operable to communicate with the serving node. The SAP is used to intercept a communication upon the detection of an event in the packet mode data network. Upon the detection of an event, the SAP gathers communication related information of the intercepted communication and provides the gathered information to a law enforcement agency.

The system and method of the present invention allows telecommunications carriers to provide communication related information in a packet communication to law enforcement agencies. Thus, law enforcement agencies can be provided with information that they have been authorized to intercept by a court of competent jurisdiction. In one aspect, the method and system of the present invention allows providing of call or session control information, for example signaling information associated with the initiation of a call or session. In another aspect, the method and system of the present invention allows providing of information related to the actual establishment or release of a connection path between the intercept subject and a network. In yet another aspect, the method and system of the present invention allows detection of the source and destination addresses of packets being transferred over the established path.

Other aspects and features of the invention will become apparent to those ordinarily skilled in the art upon review of the following description of specific embodiments of the invention in conjunction with the accompanying figures.

BRIEF DESCRIPTION OF THE DRAWING

For a more complete understanding of the present invention, the objects and advantages thereof, reference is now made to the following descriptions taken in connection with the accompanying figures in which:

FIG. 1 is a block diagram of a preferred embodiment network that incorporates teachings of the present invention for providing call or session control information;

FIG. 2 is a block diagram of a preferred embodiment network that incorporates teachings of the present invention for providing information about the establishment and/or release of a packet mode communication path;

FIG. 4 shows a preferred embodiment network layer packet of the present invention;

FIG. 5 is a preferred embodiment flowchart for providing communication related information to a law enforcement agency according to the teachings of the present invention.

DETAILED DESCRIPTION OF THE DRAWINGS

The preferred embodiment of the present invention and its advantages are best understood by referring to FIGS. 1 through 6 of the drawings, like numerals being used for like and corresponding parts of the various drawings.

Figure 6:
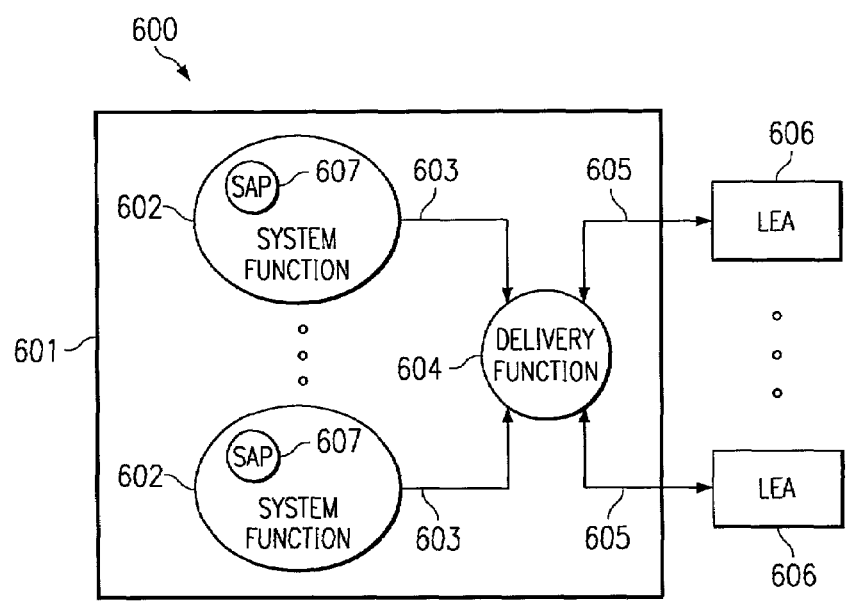
FIG. 6 is a block diagram of a surveillance network reference model incorporating teachings of the present invention.

FIG. 6 is a block diagram of a surveillance network reference model incorporating teachings of the present invention. Network 600 includes one or more system functions 602, such as a Call Management System (CMS), a path establishment function, and/or the like, that may reside in a telecommunications service provider network 601, and at least one law enforcement agency (LEA) 606. LEA 606 may operate in one or more jurisdictions under a variety of country-specific regulations that telecommunications service providers will be required to provide support. For example, regulations will govern commercial GPRS network deployments for Germany and Australia, and the Communications Assistance for Law Enforcement Act (CALEA) will govern packet data network deployments in the United States.

It may be illustrative to discuss network 600 by using a standard such as the TIA J-STD-025 (Interim Standard for Lawfully Authorized Electronic Surveillance). TIA J-STD-025 provides for call intercept operations to be performed within a telecommunications network 601 using a variety of logical functions, including an system function 602 and delivery function 604. Telecommunications network 601 may use any networking technology and/or protocol such as, but not limited to, Cellular Digital Packet Data (CDPD), Time Division Multiple Access (TDMA), Call Division Multiple Access (CDMA), Direct Asynchronous Data Service (DADS), Cable Digital Subscriber Line (DSL), General Packet Radio Services (GPRS) and Radio Transmission Technologies (e.g., 1xRTT), and Universal Mobile Telecommunications System (UMTS). System function 602 includes a Surveillance Access Point (SAP) 607 that provides the technical capability to obtain, or intercept, communication related information requested from a LEA 606. SAP 607 may have its own database, or access another database within network 601, that includes targets or identifiers that it is to intercept. In the preferred embodiment, system function 602 is coupled to and provides call interception information via interface 603 to delivery function 604. Delivery function 604 may then be used to transport the call intercept information to a collection function in LEA 606 using an interface 605 defined in the TIA/EIA/IS-J-STD-025 standard. The TIA/EIA/IS-J-STD-025 standard is described in a document titled "LAWFULLY AUTHORIZED ELECTRONIC SURVEILLANCE" available from Global Engineering Documents, 15 Inverness Way East, Englewood, Colo. 80112, U.S.A. The disclosure of this document is incorporated herein by reference.

Interface 603 desirably incorporates transport protocols, provisioning and delivery mechanisms that are all common to a plurality of networking technologies and/or protocols, to deliver technology-specific information to delivery function 604. Interface 605 desirably incorporates transport protocols, provisioning and delivery mechanisms that are all common to a plurality of networking technologies and/or protocols, to deliver technology-specific information to LEA 606.

In operation, LEA 606 may obtain an identity of a device or a subscriber, for example the subscriber's cellular phone number, the subscriber's cellular phone equipment serial number (ESN), subscriber's International Mobile Subscriber Identity (IMSI), IP address and/or the like that is suspected to be used for illegal purposes. System function 602 then receives a call intercept request, which may include this identifier, along with other information, such as the identifier to intercept, identifier of a delivery function to send the information to, such as a port number, an Ethernet address, and/or the like of the delivery function. The call intercept request may then be stored in a database associated with SAP 607. After interception, call intercept information is provided to one or more LEA 606 over interface 605 in response to the request. A number of different LEAs 606 may monitor a single subscriber or number, over one or more telecommunication networks 601.

FIG. 1 is a block diagram of a preferred embodiment network 100 that incorporates teachings of the present invention for providing communication related information, such as call or session control information to a LEA. In the preferred embodiment, network 100 is a UMTS network and is utilized to intercept signaling information, such as H.323, SIP and/or the like, for providing to a LEA. The information provided to the LEA includes call or session control information for establishing, controlling, and/or releasing calls or sessions.

As shown in FIG. 1, network 100 comprises a mobile terminal (MT) 101 coupled to a base station 102. In the preferred embodiment, MT 101 is a wireless device, such as a wireless phone, a personal digital assistant (PDA), a pager and/or the like. If desired, MT 101 may be coupled to a terminal equipment, such as a personal computer (not shown) or the functionality of the terminal equipment may be built into the MT. In the preferred embodiment, the wireless device is under the control of the intercept subject, i.e. the subject under surveillance.

MT 101 communicates with an associate device 109 across a network 107. Network 107 preferably comprises a packet network, such as an IP network. Accessing system 110 such as a telecommunication service provider network includes a base radio station 102, such as a Radio Access Network (RAN); a serving node 103, such as a Visitor Location Register (VLR) 103, for example, a Serving GPRS Support Node (SGSN), an Extended Serving GPRS Support Node (E-SGSN) and/or the like; a system function 104, such as a Call Management System (CMS), for example a Call State Control Function (CSCF); a Surveillance Access Point (SAP) 105; and a Gateway node 106, such as a Gateway GPRS Support Node (GGSN), an Extended Gateway GPRS Support Node (E-GGSN) and/or the like. In the preferred embodiment, SAP 105 communicates with LEA 108, optionally via delivery function 111; the CMS 104 communicates with the network 107 and the serving node 103; and gateway node 106 communicates with network 107. As shown in FIG. 1, in the preferred embodiment, a VoIP call is being established by accessing system 110 across a packet mode network and the VoIP call is not being interworked into the Public Switched Telephone Network (PSTN) via gateways. The advantage of reporting the relevant signaling, such as SIP/H.323 signaling instead of attempting to map the SIP/H.323 signaling to the call events of a standard such as the TIA J-STD-025 is that the signaling can be reported directly and there is no need to map the signaling. TIA J-STD-025 provides for call intercept operations to be performed within a telecommunications network using a variety of logical functions, including a service provider administration function coupled to a system function and delivery function.

In the preferred embodiment, SAP 105 is part of CMS 104 and provides the technical capability to obtain or intercept communications related information, such as call identifying information, from a communication.

In the preferred embodiment, when a user of the MT 101, who is the subject of the surveillance, attempts to make a call to device 109, the call set-up message or signaling information, such as SIP or H.323, is received by the system function 104 via base station 102 and VLR 103. In the preferred embodiment, the CMS establishes the connection between MT 101 and device 109 via network 107. The edge node 106 routes the received IP traffic to associate device 109 through network 107.

SAP 105 of the system function 104 recognizes that an event has occurred at the target device for example by detecting and intercepting the signaling to and from the MT and gathers the communication related information from the communication. The SAP 105 encapsulates the gathered signal information into a report and sends the report to LEA 108 optionally via delivery function 111. The delivery function receives the signal information from the SAP, formats the signal information into a report and sends the report to, for example a collection function in LEA 108. In the preferred embodiment, the report provided to the LEA 108 includes call identifying information, such as for example, call session information. The call session information may include information, such as CaseIdentity, IAPSystemIdentity, TimeStamp, CallSessionID, CallSessionInfoType, CallSessionInfo and/or other information. In the preferred embodiment, CaseIdentity may be included to identify the subject of the intercept; IAPSystemIdentity may be included to identify the system containing the SAP when the underlying data carriage does not imply that system; a time stamp may be included to identify the date and time that the event was detected; the CallSessionID may be included to indicate the call or session ID assigned to the call or session to identify the call or session; the CallSessionInfoType is included to indicate the type of signaling, for example H.323, SIP and/or the like; and the CallSessionInfo is included to provide the actual signaling to and from the subject device, such as INVITE, for SIP; SETUP for H.323 and/or the like. The CallSessionInfo preferably depends on the CallSessionInfoType.

The advantage of the preferred embodiment system and method as described above is that it provides a system and method for reporting call or session control information of a packet mode communication to a LEA.

FIG. 2 is a block diagram of a preferred embodiment network 200 that incorporates teachings of the present invention for providing communication related information, such as information about the establishment or release of a packet mode communication path. In the preferred embodiment, the path is established between MT 101 and a network 107. Network 107 invites the subject's traffic, for example IP traffic, to network service 202. Network service 202 may be for example an Internet Service Provider, another wireless device, and/or the like. Similar to wireline systems, wireless systems utilizing packet mode communications establish a communication path across the accessing system 110 from the subject's device 101 to a network 107 before communication between the intercept subject and an associate can begin. The accessing system may support exchange of both VoIP and data, such as real-time data, for example, multimedia, between a subject and an associate. The establishment and release of this path could be reported to assist a LEA in recognizing when an intercept subject has established communication ability with the associate.

In network 200 of FIG. 2, accessing system 110 includes a base radio station 102, a serving node 103, for example a VLR, and a gateway node 106. A system function 204, such as a Path Establishment Function (PEF) could be included in one or more of the serving nodes and/or the gateway node as shown by dotted lines in FIG. 2. In the preferred embodiment, the PEF is located at serving node 103. In the preferred embodiment, the PEF is utilized for establishing and/or releasing the path between the intercept subject and network 107. The PEF also preferably includes a Surveillance Access Point (SAP) for providing information to LEA 108 about the establishment or release of a connection path.

In the preferred embodiment, when a user of MT 101, desires to establish (or release) a connection, say with its preferred ISP, the user indicates that to the MT preferably by an input device, such as a stylus. The MT sends a message in packet mode, preferably a session activation message, such as a PDP context activation message in the case of a user desiring to establish a connection (or a session release message, such as a PDP context deactivation message in the case of a user desiring to release a connection), to the PEF 204 which interprets the message and determines that the user desires to establish (or release) a connection with network 107. The SAP intercepts the signal and records it. The PEF dynamically establishes a path between the MT and the network 107. Once the communication path is established the SAP generates a report and transmits it to LEA 108, optionally via delivery function 111. The delivery function receives the signal information from the SAP, formats the signal information into a report and sends the report, for example to a collection function in LEA 108. A binding point 203, such as an APN binding point, may be used to bind the path established between the MT and the accessing system to network 107 for communicating with network service 202.

In the preferred embodiment, the report provided to the LEA 108 includes call identifying information, such as for example, path established (or path released) information. The path established (or path released) information may include information, such as CaseIdentity, IAPSystemIdentity, TimeStamp, AccessPathID, PathStatus and/or the like. In the preferred embodiment, the AccessPathID may be included to indicate the identity of the established path. The PathStatus may be used to indicate whether a path between the intercept subject and the network is established or released.

After a communication path is established by the accessing system between the MT and the network, the subject can communicate directly with an associate over the connecting path. The subject traffic is carried across an accessing system and routed/transported via a network to an associate. The traffic may be VoIP or other type of data. The network layer protocol carried by the accessing system may be IP based and the IP routing header may indicate the source and destination parties for the traffic. The network layer preferably has the source and destination address of all packets being sent to or received by the intercept subject. Thus, by intercepting a packet being transmitted over an established path, the source and destination address may be determined. In addition, the destination party address in the IP header may be different from the delivered-to party and the accessing system may have information relative to the delivered-to party. With an IP network layer the source and destination addresses for the IP packet in the IP header could be reported to a LEA.

Figure 3:
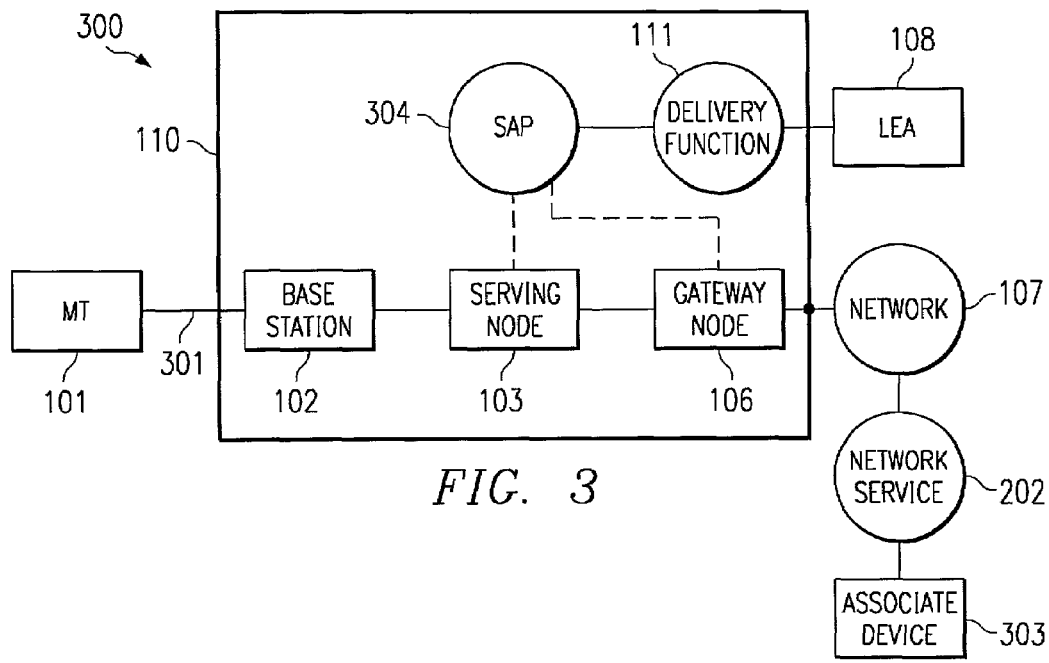
FIG. 3 is a block diagram of a preferred embodiment network that incorporates teachings of the present invention for providing information about the origin, and/or destination of a packet mode communication.

FIG. 3 is a block diagram of a preferred embodiment network 300 that incorporates teachings of the present invention for providing information about the origin, direction and/or destination of a packet mode communication. In network 300 of FIG. 3, a MT 101 is shown coupled with accessing system 110 via path 301. Accessing system 110 delivers the traffic from MT 101 to network service 202 via network 107. The network service 202 communicates with associate device 303. A SAP 304 may be included in any of serving node 103 or gateway node 106, preferably in gateway node 106. Thus, when MT 101 sends packets over the established path, the SAP intercepts the packets.

FIG. 4 shows a preferred embodiment network layer packet 400 of the present invention. Packet 400 includes a payload 401 and a network layer 402. Payload 401 is the content of the packet, i.e. the information being sent over the established path. Network layer 402 includes header information about the packet, such as source address, destination address, and/or the like. The source and destination addresses are preferably IP addresses. Thus, the SAP can extract the header information from a packet being sent by MT 101 and send it to delivery function 111. The delivery function receives the information from the SAP, formats it into a report and sends the report to, for example a collection function in LEA 108.

The MT may be sending packets to the network service 202, for example an ISP. In that case the destination IP address is the IP address of the ISP. On the other hand if the MT is sending packets to some other device, for example an associate device 303 associated with an associate of the intercept subject then the IP address on the packet is the IP address of the device to which the packet is being sent, for example associate device 303. Thus, by intercepting the packets being sent by the MT over the established path, a determination can be made as to who the subject is communicating with.

In the preferred embodiment, the report provided to the LEA 108 includes communication related information, such as source and destination information for the traffic between the subject and the associate or the network service. The communication related information may include information, such as CaseIdentity, IAPSystemIdentity, TimeStamp, AccessPathID, SourceAddress, DestinationAddress, DeliveredToAddress, and/or the like. In the preferred embodiment, the SourceAddress is the IP address of the source of the packets and the DestinationAddress is the IP address of the destination of the packets. Either the SourceAddress or the DestinationAddress is associated with the intercept subject and may be included to indicate who the subject is communicating with or who is communicating with the subject. Moreover, SourceAddress or the DestinationAddress may also indicate the direction of packet flow. Thus, if the SourceAddress is the address of the intercept subject, then the direction of packet flow is from the subject to the associate indicating that the subject initiated the communication. On the other hand, if the DestinationAddress is the address of the intercept subject, then the direction of packet flow is from the associate to the subject indicating that the associate initiated the communication with the subject.

Multiple connection paths may be established between the subject and the network service. Moreover, multiple paths may be established between the subject and different network services. Thus, packets may be exchanged between the subject and associate via different paths. Thus, for example, a packet from the subject may be provided to the associate either through path 1 or path 2. Path 1 may have been established via ISP1 and path 2 via ISP2. When a packet from the subject is received by say ISP1 and the packet is intended to be delivered to the associate, then ISP1 upon receiving the packet determines that the packet is intended to be delivered to the associate and transmits the packet to the associate. Thus, if desired, a DeliveredToAddress may be included in the report sent to the LEA to indicate which network service the packet was delivered to before being provided to associate 303.

FIG. 5 is a preferred embodiment flowchart 500 for providing communication related information to a law enforcement agency according to the teachings of the present invention. As shown in the flowchart, in step 502 a suitable location for placing the SAP on the accessing system is selected. This selection is based at least in part on the type of the event which triggers the interception. Thus, if the event type is call signaling then in step 502, a node on the accessing system where call signaling information, such as SIP, H.323 and/or the like, may be intercepted is selected as the location for placing the SAP. In the preferred embodiment, if the network is a UMTS network then the SAP for intercepting call signaling information is placed at the communication management system, such as CSCF.

If the event type is establishment or release of a packet mode communication path, then in step 502 a node on the accessing system where the path establishment function is located is selected as the location for placing the SAP. In the preferred embodiment, if the network is a UMTS network, then the SAP for indicating the establishment or release of a packet mode communication path is placed at the serving node, such as SGSN.

If the event type is detection of a packet, then in step 502 a node on the accessing system where the network layer packets being sent between the intercept subject and the network service or the associate could be accessed is selected as the location for placing the SAP. In the preferred embodiment, the SAP for indicating the origin and/or destination of the packet mode communication is placed at the gateway node 106.

In step 504, the occurrence of an event is detected and upon the occurrence of an event, the message is intercepted and the desired information is gathered from the intercepted message. The type of information gathered depends on the received event type. Thus, if the event type is call signaling, then in step 504 preferably the information shown in Table I is gathered.

TABLE I

CaseIdentity
IAPSystemIdentity
TimeStamp
CallSessionID
CallSessionInfoType
CallSessionInfo If the event type is establishment or release of a packet mode communication path, then in step 504 preferably the information shown in Table II is gathered.

TABLE II

CaseIdentity
IAPSystemIdentity
TimeStamp
AccessPathID
PathStatus

If the event type is transmission of a packet, then in step 504 preferably the information shown in Table III is gathered.

TABLE III

CaseIdentity
IAPSystemIdentity
TimeStamp
AccessPathID
SourceAddress
DestinationAddress
DeliveredToAddress In the preferred embodiment, once the information is gathered in step 504, in step 505, the gathered information is provided to a delivery function. The delivery function receives the gathered information and preferably formats the received information into a report acceptable to a LEA. In step 506, the report is provided to, for example a collection function in one or more interested LEAs.

The systems and methods described above allow telecommunications carriers to provide communication related information in a packet communication to law enforcement agencies. Thus, law enforcement agencies can be provided with information that they have been authorized to intercept by a court of competent jurisdiction. The method and system of FIG. 1 allows providing of call or session control information, for example signaling information associated with the initiation of a call or session. The method and system of FIG. 2 allows providing of information related to the actual establishment or release of a connection path between the intercept subject and an associate or a network service. The method and system of FIG. 3 allows identification of the source and destination addresses of packets being transferred over the established path.

While the invention has been particularly shown and described by the foregoing detailed description, it will be understood by those skilled in the art that various other changes in form and detail may be made without departing from the spirit and scope of the invention.

What is claimed is:

1. A method for lawful interception of communication information comprising:
    selecting a location for intercepting a communication in a packet data network based at least in part on an event type;
    receiving an intercept request for authorized interception of information of a communication with a target device, wherein the intercept request is associated with a predetermined event having an event type of a plurality of event types;
    detecting the occurrence of the predetermined event in said packet data network;
    gathering a set of communication information relating to the type of the predetermined event from said communication at said selected location in response to detection of the occurrence of said type of the predetermined event, wherein information associated with the communication of other event types of the plurality of event types is not gathered; and
    transmitting said gathered communication information to at least one law enforcement agency.

2. The method of claim 1, wherein said packet data network comprises a UMTS network.

3. The method of claim 1, wherein said interception is performed by a Surveillance Access Point (SAP).

4. The method of claim 1, wherein said selecting a location comprises intercepting said communication at a CSCF in said packet data network if the event is a call signaling event.

5. The method of claim 1, wherein said selecting a location comprises intercepting said communication at a serving node in said packet data network if the event is a path establishment or a path release.

6. The method of claim 5, wherein said serving node is selected from the group consisting of a SGSN and an E-SGSN.

7. The method of claim 1, wherein said selecting a location comprises intercepting said communication at a gateway node in said packet data network if the event is transmission of a packet.

8. The method of claim 7, wherein said gateway node is selected from the group consisting of a GGSN and an E-GGSN.

9. The method of claim 1, wherein said transmitting said gathered communication related information further comprises:
    providing said gathered information to a delivery function;
    formatting said gathered information by said delivery function into a format acceptable to said at least one law enforcement agency; and
    forwarding said formatted information to said law enforcement agency.

10. The method of claim 9, wherein said delivery function utilizes a J-STD-025 interface.

11. The method of claim 3, wherein said transmitting said gathered communication related information comprises:
    formatting said gathered information by said SAP into a report acceptable to said at least one law enforcement agency; and
    providing said report to said law enforcement agency.

12. The method of claim 1, wherein the type of said predetermined event comprises call signaling, path establishment or path release, and transmission of a packet.

13. The method of claim 1, wherein said gathered communication information includes information related to call signaling.

14. The method of claim 1, wherein said gathered communication information includes information related to path establishment or path release.

15. The method of claim 1, wherein said gathered communication information includes packet information.

16. The method of claim 13, wherein said call signaling information includes information indicating the type of signaling, wherein said information is selected from the group consisting of H.323 and SIP.

17. The method of claim 14, wherein said path establishment information includes information indicating the status of a path between a mobile terminal and said packet network, wherein said information is selected from the group consisting of established and released.

18. The method of claim 15, wherein said packet information includes a source address and a destination address of a packet.

19. A method for lawful interception of communication related information, comprising:
    receiving an intercept request for authorized interception of information of a communication with a target device, wherein the intercept request is associated with a predetermined event having an event type of a plurality of event types;
    detecting the occurrence of the predetermined event in a packet data network;
    collecting a set of communication information relating to the type of the event from a communication in said packet data network in response to said detection of the type of the events wherein information associated with the communication of other event types of the plurality of event types is not collected; and providing said collected communication relating information to one or more law enforcement agencies.

20. The method of claim 19, wherein said packet data network includes a UMTS network.

21. The method of claim 19, wherein said detected predetermined event is a call signaling event and said collected communication information includes information selected from the group consisting of H.323 and SIP, and information selected from the group consisting of a time stamp for the detection of the occurrence of said event, a session identifier, and an identifier of the type of the communication.

22. The method of claim 19, wherein said detected predetermined event is selected from the group consisting of the establishment of a path and release of a path, wherein said collected communication relating information includes a path related information, wherein said path related information is selected from the group consisting of path established and path released, wherein said collected information further includes information selected from the group consisting of a time stamp for the detection of the occurrence of said event, and a path identifier for said path.

23. The method of claim 19, wherein said detected predetermined event is transmission of a packet in said packet data network, wherein said packet includes a payload and a network layer, and wherein said collected communication related information includes information selected from the group consisting of source address of said packet and a destination address of said packet.

24. The method of claim 23, wherein said information further includes information selected from the group consisting of a path identifier for a path utilized for said transmission of said packet and an address of a network service to which said packet is delivered prior to being delivered to said destination address.

25. The method of claim 19, wherein said providing comprises:

providing said collected information to a delivery function;

formatting said collected information by said delivery function into a format acceptable to said one or more law enforcement agencies; and providing said formatted information to said one or more law enforcement agencies.

26. A system for lawful interception of communication related information, comprising:

means for receiving an intercept request for authorized interception of information of a communication with a target device, wherein the intercept request is associated with a first event having an event type of a plurality of event types;

means for detecting the occurrence of the first event in a packet data network;

means for collecting information relating to the event type from the communication in said packet data network in response to detecting the occurrence of the first event, wherein information associated with the communication of other event types of the plurality of event types is not collected; and means for providing said collected information to one or more law enforcement agencies.

27. A system for lawful interception of communication related information, comprising:

a base station for receiving an event from an intercept device in a packet mode data network, wherein the intercept device is associated with an intercept request for authorized interception of information of a communication with the intercept device, and wherein the intercept request is associated with a first event having an event type of a plurality of event types;

a node operable to communicate with said base station; and a surveillance access point (SAP) operable to communicate with said node, wherein said SAP intercepts the communication upon the detection of said first event in said packet mode data network, and wherein said SAP gathers information relating to the event type of the first event from said intercepted communication upon the detection of the event type and provides said gathered information to a law enforcement agency, and wherein information associated with the communication of other event types of the plurality of event types is not gathered.

28. The system of claim 27, wherein said base station is a Radio Access Network.

29. The system of claim 27, wherein said intercept device is a mobile terminal selected from the group consisting of a wireless phone, a personal digital assistant, and a pager.

30. The system of claim 27, wherein said node is a serving node.

31. The system of claim 27, wherein said node is a SGSN.

32. The system of claim 27, wherein said SAP is part of a node selected from the group consisting of a serving node and a gateway node.

33. The system of claim 27, wherein said SAP is part of a node selected from the group consisting of a serving GPRS support node, an extended serving GPRS support node, a gateway GPRS support node, and an extended gateway GPRS support node.

34. The system of claim 27, wherein said gathered information includes information about the initiation of a call setup by said intercept device.

35. The system of claim 27, wherein said gathered information includes information about the initiation of a session setup by said intercept device.

36. The system of claim 27, wherein said gathered information includes information about the establishment of a communication path between said intercept device and a network service.

37. The system of claim 27, wherein said gathered information includes information about the release of a communication path between said intercept device and a network service.

38. The system of claim 27, wherein said gathered information includes the destination address of a packet transmitted over a communication path between said intercept device and a network service.

39. The system of claim 38, wherein said destination address is the address of said network service.

40. The system of claim 38, wherein said destination address is the address of another device associated with said network service and said gathered information further includes an address of said network service, wherein said packet is delivered to said another device via said network service.

41. The system of claim 38, wherein said network service is associated with an Internet Service Provider (ISP).

42. The system of claim 38, wherein said destination address is the address of an associate device.

* * * * *